(12) United States Patent
Shan et al.

(10) Patent No.: US 9,152,804 B2
(45) Date of Patent: Oct. 6, 2015

(54) MEDIA RESOURCE ACCESS CONTROL METHOD AND DEVICE

(71) Applicant: Huawei Device Co., Ltd., Shenzhen (CN)

(72) Inventors: Zhenwei Shan, Shenzhen (CN); Huangwei Wu, Shenzhen (CN); Yu Zhu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 58 days.

(21) Appl. No.: 14/145,239

(22) Filed: Dec. 31, 2013

(65) Prior Publication Data

US 2014/0115721 A1    Apr. 24, 2014

Related U.S. Application Data

(63) Continuation of application No. PCT/CN2012/078111, filed on Jul. 3, 2012.

(30) Foreign Application Priority Data

Jul. 11, 2011   (CN) .......................... 2011 1 0193031

(51) Int. Cl.
*H04L 29/06* (2006.01)
*G06F 21/60* (2013.01)
(Continued)

(52) U.S. Cl.
CPC .............. *G06F 21/604* (2013.01); *G06F 17/30* (2013.01); *H04L 12/2803* (2013.01);
(Continued)

(58) Field of Classification Search
CPC . G06F 17/30; G06F 21/604; G06F 17/30053; G06F 3/1236; H04L 12/2803; H04L 12/2812; H04L 63/083; H04L 65/1069; H04L 65/4084; H04L 65/4092; H04L 63/062; H04L 21/2747
See application file for complete search history.

(56) References Cited

U.S. PATENT DOCUMENTS 7,254,836 B2    8/2007  Alkove et al.
2005/0138193 A1*  6/2005  Encarnacion et al. ........ 709/230
(Continued)

FOREIGN PATENT DOCUMENTS

| CN | 101006679 A | 7/2007 |
| CN | 101523801 A | 9/2009 |
| KR | 20060091870 A | 8/2006 |

OTHER PUBLICATIONS

Ritchie, J., et al., "UPnP AV Architecture: 2," XP055032201, Retrieved from the Internet: URL: http:/upnp.org/specs/av/UPnP-av-AVArchitecture-v2.pdf, Dec. 31, 2010, 35 pages.
(Continued)

*Primary Examiner* — Yogesh Paliwal
(74) *Attorney, Agent, or Firm* — Conley Rose, P.C.; Grant Rodolph; Adam J. Stegge

(57) ABSTRACT

A media resource access control method and device, where the method includes: receiving, by a universal plug and play (UPnP) media server, a media resource identifier sent by a control point and acquiring preset verification information corresponding to the media resource identifier; receiving a media resource acquisition request sent by a UPnP media player, where the media resource acquisition request contains to-be-verified information; and verifying the to-be-verified information by using the preset verification information, and if the verification is passed, sending a media resource corresponding to the media resource identifier to the UPnP media player.

16 Claims, 8 Drawing Sheets

(51) Int. Cl.
  *G06F 17/30* (2006.01)
  *H04L 12/28* (2006.01)

(52) U.S. Cl.
  CPC ......... *H04L 12/2812* (2013.01); *H04L 63/083* (2013.01); *H04L 65/1069* (2013.01); *H04L 65/4084* (2013.01); *H04L 65/4092* (2013.01); *H04L 63/062* (2013.01)

(56) References Cited

U.S. PATENT DOCUMENTS

2005/0283618 A1* 12/2005 Min .............................. 713/182
2007/0118849 A1* 5/2007 Kisel et al. ...................... 725/25
2008/0092211 A1 4/2008 Klemets et al.

OTHER PUBLICATIONS

Sales, T., et al., "A UPnP Extension for enabling user authentication and authorization in pervasive systems," XP055143475, Journal of the Brazilian Computer Society, vol. 16, No. 4, Oct. 7, 2010, 18 pages.
"FM 22-6 Field Manual Gaurd Duty," XP055143840, Retrieved from the Internet: URL: http://militaryscience.usu.edu/ files/uploads/cadet_toolbox/gaurd_duty_FM_22-6.pdf, Sep. 1, 1971, 121 pages.
Wikipedia, "Digital Signature," XP055144273, Retrieved from the Internet: URL: http://en.wikipedia.org/w/index.php? title=digital_signature&oldid=434130054, Jun. 13, 2011, 10 pages.
Foreign Communication From a Counterpart Application, European Application No. 12811616.7, Extended European Search Report dated Oct. 14, 2014, 14 pages.
Foreign Communication From a Counterpart Application, PCT Application No. PCT/CN2012/078111, English Translation of International Search Report dated Oct. 4, 2012, 3 pages.
Foreign Communication From a Counterpart Application, PCT Application No. PCT/CN2012/078111, English Translation of Written Opinion dated Oct. 4, 2012, 19 pages.

* cited by examiner

MEDIA RESOURCE ACCESS CONTROL METHOD AND DEVICE

CROSS-REFERENCE TO RELATED APPLICATION

This application is a continuation of PCT/CN2012/078111, filed on Jul. 3, 2012, which claims priority to Chinese Patent Application No. 201110193031.X, filed on Jul. 11, 2011, both of which are hereby incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to communications technologies, and in particular, to a media resource access control method and device.

BACKGROUND

A universal plug and play (UPnP)/digital living network alliance (DLNA) standard has implemented media sharing applications on a home network, where the standard defines three entities, respectively: a media renderer, a media server, and a control point. Specifically, the control point queries a media server for media resource information, where between the control point and the media server is under device protection (DP). When the control point has permission to access the media server, the media server returns information such as a uniform resource identifier (URI) list to the control point, and then the control point selects a URI and sends it to the media renderer, and lastly, the media renderer requests from the media server a media resource indicated by the URI, and plays the media resource.

However, other control points may guess or intercept a URI on the media server and then easily steal a protected media resource on the media server.

SUMMARY

Embodiments of the present invention provide a media resource access control method and device, so as to overcome a defect in the prior art that other control points may guess or intercept a URI on a media server and may easily steal a protected media resource on the media server, thereby ensuring media resource security.

An embodiment of the present invention provides a media resource access control method, including: receiving, by a UPnP media server, a media resource identifier sent by a control point, and acquiring preset verification information corresponding to the media resource identifier; receiving, by the UPnP media server, a media resource acquisition request sent by a UPnP media player, where the media resource acquisition request contains to-be-verified information; and verifying, by the UPnP media server, the to-be-verified information by using the preset verification information, and if the verification is passed, sending a media resource corresponding to the media resource identifier to the UPnP media player.

An embodiment of the present invention further provides a media resource access control method, including: acquiring, by a UPnP media player, to-be-verified information; and sending, by the UPnP media player, a media resource acquisition request carrying the to-be-verified information to a UPnP media server, so that the UPnP media server verifies the to-be-verified information by using preset verification information.

An embodiment of the present invention further provides a media resource access control method, including: sending, by a control point, a media resource browse or query request to a UPnP media server, and receiving media resource information returned by the UPnP media server; selecting, by the control point, a URI from the media resource information and generating a random number; performing, by the control point, a hash algorithm on the URI, the random number, and a control point identifier of the control point and encrypting a character string acquired by the hash algorithm by using a private key to obtain a second character string; and combining, by the control point, the URI, the random number, the control point identifier, and the second character string to obtain a first character string, and sending the first character string to a UPnP media player so that the UPnP media player uses the first character string as to-be-verified information.

An embodiment of the present invention further provides a media resource access control method, including: receiving, by a UPnP media server, a media resource acquisition request sent by a UPnP media player, where the media resource acquisition request contains to-be-verified information; decrypting, by the UPnP media server, an encrypted character string in the to-be-verified information by using a public key to obtain a character string after the decryption, and performing a hash algorithm on a control point identifier, a random number, and a URI in the to-be-verified information to obtain a character string acquired by the hash algorithm; and determining, by the UPnP media server, whether the character string acquired by the hash algorithm and the character string after the decryption are consistent, and if the character string acquired by the hash algorithm and the character string after the decryption are consistent, verifying whether a control point corresponding to the control point identifier has permission to access a media resource corresponding to the URI, and if the verification is passed, sending the media resource corresponding to the URI to the UPnP media player.

An embodiment of the present invention provides a UPnP media server, including: a memory for storing computer executable instructions; a processor configured to execute the computer executable instructions to: receive a media resource identifier sent by a control point; acquire preset verification information corresponding to the media resource identifier; receive a media resource acquisition request sent by a UPnP media player, where the media resource acquisition request contains to-be-verified information; verify the to-be-verified information by using the preset verification information; and if the verification is passed, send a media resource corresponding to the media resource identifier to the UPnP media player.

An embodiment of the present invention provides a UPnP media player, including: a memory for storing computer executable instructions; a processor configured to execute the computer executable instructions to: acquire to-be-verified information; and send a media resource acquisition request carrying the to-be-verified information to a UPnP media server, so that the UPnP media server verifies the to-be-verified information by using preset verification information.

An embodiment of the present invention provides a control point, including: a memory for storing computer executable instructions; a processor configured to execute the computer executable instructions to: send a media resource browse or query request and receive media resource information returned by a UPnP media server; select a URI from the media resource information; generate a random number; perform a hash algorithm on the URI, the random number, and a control point identifier of the control point and encrypt a character string acquired by the hash algorithm by using a private key to obtain a second character string; combine the URI, the random number, the control point identifier, and the second character string to obtain a first character string; and send the first character string to a UPnP media player so that the UPnP media player uses the first character string as to-be-verified information.

An embodiment of the present invention provides a UPnP media server, including: a memory for storing computer executable instructions; a processor configured to execute the computer executable instructions to: receive a media resource acquisition request sent by a UPnP media player, where the media resource acquisition request contains to-be-verified information; decrypt an encrypted character string in the to-be-verified information by using a public key to obtain a character string after the decryption, and perform a hash algorithm on a control point identifier, a random number, and a URI in the to-be-verified information to obtain a character string acquired by the hash algorithm; determine whether the character string acquired by the hash algorithm and the character string after the decryption are consistent; if the character string acquired by the hash algorithm and the character string after the decryption are consistent, verify whether a control point corresponding to the control point identifier has permission to access a media resource corresponding to the URI; and if the verification is passed, send the media resource corresponding to the URI to the UPnP media player.

In the media resource access control method and device of the embodiments of the present invention, a UPnP media server receives a media resource identifier sent by a control point and acquires preset verification information corresponding to the media resource identifier; receives a media resource acquisition request sent by a UPnP media player, where the media resource acquisition request contains to-be-verified information; and verifies the to-be-verified information by using the preset verification information, and if the verification is passed, sends a media resource corresponding to the media resource identifier to the UPnP media server, which overcomes a defect that in the prior art that other control points may guess or intercept a URI on a media server and may easily steal a protected media resource on the media server, thereby ensuring media resource security.

BRIEF DESCRIPTION OF DRAWINGS

To illustrate the technical solutions in the embodiments of the present invention or in the prior art more clearly, the accompanying drawings required for describing the embodiments or the prior art are briefly described in the following. Apparently, the accompanying drawings in the following description merely show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
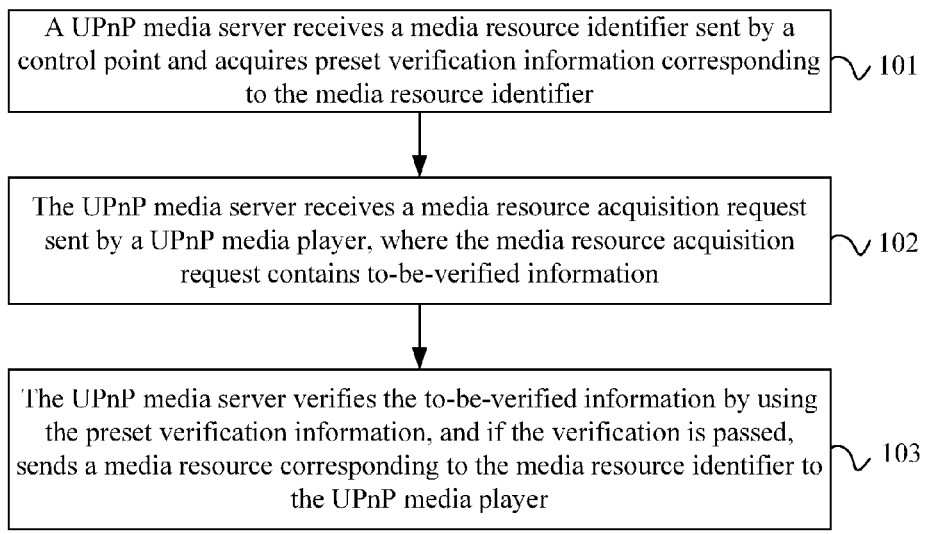
FIG. 1 is a flowchart of an embodiment of a media resource access control method according to the present invention.

FIG. 1 is a flowchart of an embodiment of a media resource access control method according to the present invention. As shown in FIG. 1, the method of this embodiment includes the following.

Step 101: An UPnP media server receives a media resource identifier sent by a control point and acquires preset verification information corresponding to the media resource identifier.

In this embodiment, the content directory service of the media server is protected by a device protection, that is, a security channel is established between the control point and the media server, where the security channel is a secure sockets layer (SSL)/transport layer security (TLS) security channel. The control point sends a media resource browse request or a media resource query request through the security channel to the UPnP media server, and the UPnP media server may verify whether the control point has access permission, and if it has the access permission, media resource information corresponding to the control point returned by the media server is received through the security channel, so that the control point selects a media resource identifier from the media resource information, where the media resource identifier may specifically be a media resource content identifier and/or a URI.

Step 102: The UPnP media server receives a media resource acquisition request sent by an UPnP media player, where the media resource acquisition request contains to-be-verified information.

Step 103: The UPnP media server verifies the to-be-verified information by using the preset verification information, and if the verification is passed, sends a media resource corresponding to the media resource identifier to the UPnP media player.

In this embodiment, a UPnP media server receives a media resource identifier sent by a control point and acquires preset verification information corresponding to the media resource identifier; receives a media resource acquisition request sent by a UPnP media player, where the media resource acquisition request contains to-be-verified information; and verifies the to-be-verified information by using the preset verification information, and if the verification is passed, sends a media resource corresponding to the media resource identifier to the UPnP media player, which overcomes a defect that in the prior art that other control points may guess or intercept a URI on a media server and may easily steal a protected media resource on the media server, thereby ensuring media resource security.

Further, in another embodiment of the present invention, based on the embodiment as shown in FIG. 1, the specific implementation manner of acquiring preset verification information corresponding to the media resource identifier in step 101 may include the following three types:

First type: The UPnP media server receives the media resource identifier sent by the control point and determines whether the control point has permission to access the media resource corresponding to the media resource identifier; and if it is determined that the control point has the permission to access the media resource corresponding to the media resource identifier, generates a password and sets the password and the media resource identifier as preset verification information.

Second type: The UPnP media server receives the media resource identifier and a UPnP media player identifier that are sent by the control point and determines whether the control point has permission to access the media resource corresponding to the media resource identifier; and if it is determined that the control point has the permission to access the media resource corresponding to the media resource identifier, sets the UPnP media player identifier and the media resource identifier as preset verification information.

Third type: The UPnP media server receives the media resource identifier and a password that are sent by the control point and determines whether the control point has permission to access the media resource corresponding to the media resource identifier, where the password is a password generated by the control point; and if it is determined that the control point has the permission to access the media resource corresponding to the media resource identifier, sets the password and the media resource identifier as preset verification information.

Further, if the control point selects a media resource content identifier from the media resource information and sends the media resource content identifier to the UPnP media server, and the to-be-verified information contains a URI, the specific implementation manner of verifying, by the UPnP media server, the to-be-verified information by using the preset verification information in step 103 may be: acquiring, by the UPnP media server, a media resource content identifier corresponding to the URI in the to-be-verified information, and replacing the URI in the to-be-verified information with the media resource content identifier; and verifying, by the UPnP media server, the to-be-verified information by using the preset verification information after the replacement.

Figure 2:
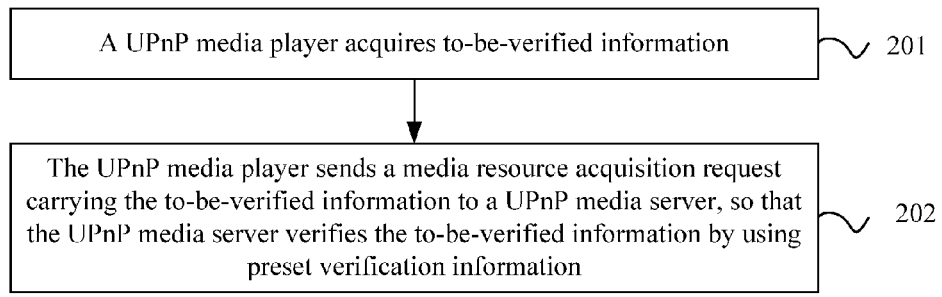
FIG. 2 is a flowchart of another embodiment of a media resource access control method according to the present invention.

FIG. 2 is a flowchart of another embodiment of a media resource access control method according to the present invention. As shown in FIG. 2, the method of this embodiment includes the following.

Step 201: An UPnP media player acquires to-be-verified information.

Step 202: The UPnP media player sends a media resource acquisition request carrying the to-be-verified information to an UPnP media server, so that the UPnP media server verifies the to-be-verified information by using preset verification information.

In this embodiment, the method for the UPnP media server to set the preset verification information is the same as the foregoing method for the UPnP media server to obtain the preset verification information, and the UPnP media server may further implement the technical solution of the method embodiment as shown in FIG. 1, an implementation principle of which is similar and is not described herein again.

In this embodiment, a UPnP media player acquires to-be-verified information and sends a media resource acquisition request carrying the to-be-verified information to a UPnP media server, so that the UPnP media server verifies the to-be-verified information by using preset verification information, which overcomes the defect in the prior art that other control points may guess or intercept a URI on the media server and may easily steal a protected media resource on the media server, thereby ensuring media resource security.

Further, in still another embodiment of the present invention, based on the method embodiment as shown in FIG. 2, to further protect communication between the control point and the UPnP media player, before step 201, the method may further include: establishing, by the UPnP media player, a security channel with the control point.

The security channel may be an SSL or a TLS. In addition, after the UPnP media player establishes the security channel with the control point and after the UPnP media player acquires the to-be-verified information, it may bind the control point and the current play behavior, for instance: the UPnP media player binds the control point identifier corresponding to the control point and an audio-video transport identifier (AVTransportID) that indicates a current play behavior, and the control point may control the UPnP media player through the AVTransportID, such as stop or fast-forward. As a binding processing is performed for the control point and the current play behavior, the effect that only the control point that initiates a play behavior is capable of controlling the play is achieved, thereby improving the controllability of media resource play.

Further, the specific implementation manner of step 201 may include the following types.

First type: The UPnP media player receives, through the security channel, a URI and a password that are sent by the control point and sets the URI and the password as the to-be-verified information.

For instance, the control point sends a media resource browse request or a media resource query request to the UPnP media server through the security channel established between the control point and the UPnP media server; the UPnP media server may verify whether the control point has access permission, and if it has the access permission, media resource information corresponding to the control point returned by the media server is received through the security channel, so that the control point selects a media resource identifier from the media resource information, generates a password, and then sends the media resource identifier and the password to the UPnP media server; and the UPnP media server determines whether the control point has the permission to access the media resource corresponding to the media resource identifier, and if it is determined that the control point has the permission to access the media resource corresponding to the media resource identifier, returns a permission pass message such as an "OK" message to the control point, and accordingly the control point establishes a security channel with the UPnP media player and sends the URI selected from the media resource information and the generated password to the UPnP media player, so that the UPnP media player sets the URI and the password as the to-be-verified information.

Or, the control point sends a media resource browse request or a media resource query request to the UPnP media server through the security channel established between the control point and the UPnP media server; the UPnP media server may verify whether the control point has access permission, and if it has the access permission, media resource information corresponding to the control point returned by the media server is received through the security channel, so that the control point selects a media resource identifier from the media resource information, and then sends the media resource identifier to the UPnP media server; and the UPnP media server determines whether the control point has the permission to access the media resource corresponding to the media resource identifier, and if it is determined that the control point has the permission to access the media resource corresponding to the media resource identifier, generates a password and returns a permission pass message such as an "OK" message to the control point, where the message includes the password generated by the UPnP media server, and accordingly the control point establishes a security channel with the UPnP media player and sends the URI selected from the media resource information and the password received from the UPnP media server to the UPnP media player, so that the UPnP media player sets the URI and the password as the to-be-verified information.

Second type: The UPnP media player receives, through the security channel, the URI sent by the control point and sets the UPnP media player identifier corresponding to the UPnP media player and the URI as the to-be-verified information.

For instance, the control point sends a media resource browse request or a media resource query request to the UPnP media server through the security channel established between the control point and the UPnP media server; the UPnP media server may verify whether the control point has access permission, and if it has the access permission, media resource information corresponding to the control point returned by the media server is received through the security channel, so that the control point selects a media resource identifier from the media resource information and selects a UPnP media player identifier and then sends the media resource identifier and the UPnP media player identifier to the UPnP media server; and the UPnP media server determines whether the control point has the permission to access the media resource corresponding to the media resource identifier, and if it is determined that the control point has the permission to access the media resource corresponding to the media resource identifier, returns a permission pass message such as an "OK" message to the control point, and accordingly the control point establishes a security channel with the UPnP media player and sends the URI selected from the media resource information to the UPnP media player, so that the UPnP media player sets the URI and the UPnP media player identifier of itself as the to-be-verified information.

Third type: The UPnP media player receives, through the security channel, a first character string sent by the control point, where the first character string includes a URI of a media resource acquired by the control point from the UPnP media server, a random number generated by the control point, a control point identifier, and a second character string, where the second character string is a character string acquired by performing a hash algorithm on the URI, the random number, and the control point identifier and encrypting a character string acquired by the hash algorithm by using a private key.

For instance, the control point sends a media resource browse request or a media resource query request to the UPnP media server through the security channel established between the control point and the UPnP media server; the UPnP media server may verify whether the control point has access permission, and if it has the access permission, media resource information corresponding to the control point returned by the media server is received through the security channel, so that the control point selects a URI from the media resource information and generates a random number (nonce), and then performs a hash algorithm on the URI, the control point identifier corresponding to the control point, and the random number and encrypts a character string acquired by the hash algorithm by using a preset private key to obtain the second character string and combines the URI, the random number, the control point identifier, and the second character string to form the first character string, and then the control point establishes a security channel with the UPnP media player and sends the first character string to the UPnP media player, for instance: the control point may send the first character string to the UPnP media player through an existing SetAVTransportURI( )Action available in a standard, so that the UPnP media player sets the first character string as the to-be-verified information.

Figure 3:
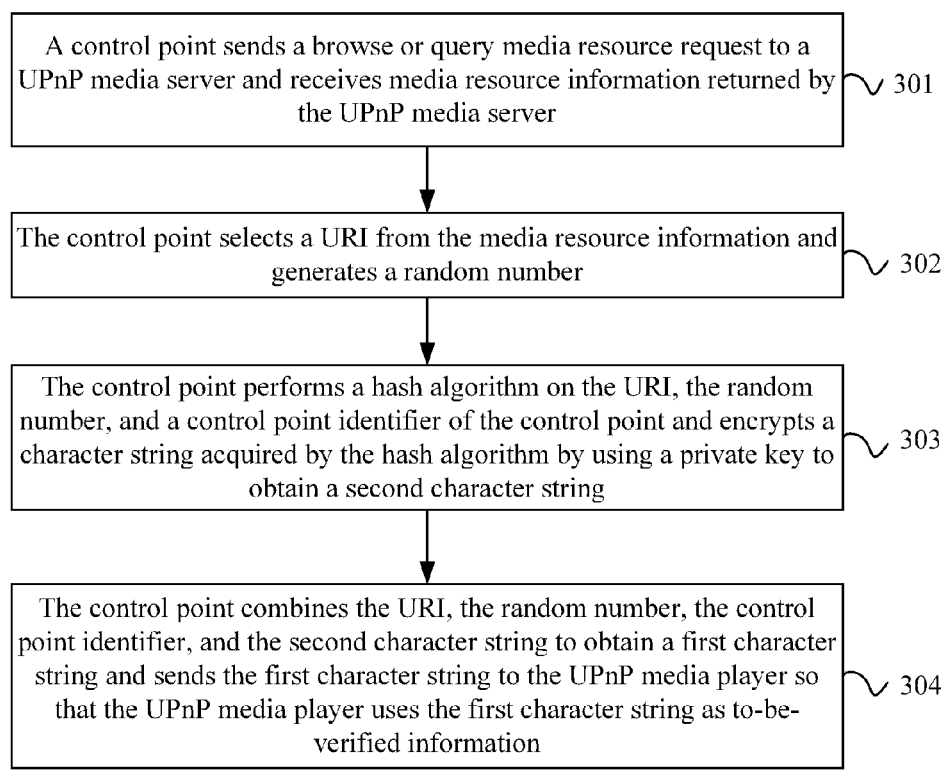
FIG. 3 is a flowchart of still another embodiment of a media resource access control method according to the present invention.

FIG. 3 is a flowchart of still another embodiment of a media resource access control method according to the present invention. As shown in FIG. 3, the method of this embodiment includes the following.

Step 301: A control point sends a media resource browse or query request to an UPnP media server and receives media resource information returned by the UPnP media server.

Step 302: The control point selects a URI from the media resource information and generates a random number.

Step 303: The control point performs a hash algorithm on the URI, the random number, and a control point identifier of the control point and encrypts a character string acquired by the hash algorithm by using a private key to obtain a second character string.

Step 304: The control point combines the URI, the random number, the control point identifier, and the second character string to obtain a first character string and sends the first character string to the UPnP media player so that the UPnP media player uses the first character string as to-be-verified information.

Specifically, the control point sends a media resource browse request or a media resource query request to the UPnP media server through the security channel established between the control point and the UPnP media server; the UPnP media server may verify whether the control point has access permission, and if it has the access permission, media resource information corresponding to the control point returned by the media server is received through the security channel, so that the control point selects a URI from the media resource information and generates a random number (nonce), and then performs a hash algorithm on the URI, the control point identifier corresponding to the control point, and the random number and encrypts a character string acquired by the hash algorithm by using a preset private key to obtain the second character string and combines the URI, the random number, the control point identifier, and the second character string to form the first character string, and then the control point establishes a security channel with the UPnP media player and sends the first character string to the UPnP media player, for instance: the control point may send the first character string to the UPnP media player through an existing SetAVTransportURI( )Action available in a standard, so that the UPnP media player sets the first character string as the to-be-verified information.

In this embodiment, a control point sends a media resource browse request or a media resource query request to a UPnP media server and receives media resource information returned by the UPnP media server; selects a URI from the media resource information and generates a random number; performs a hash algorithm on the URI, the random number, and the control point identifier and encrypts a character string acquired by the hash algorithm by using a private key to obtain a second character string; and combines the URI, the random number, the control point identifier, and the second character string to obtain a first character string and sends the first character string to the UPnP media player, so that the media player uses the first character string as to-be-verified information, so that the UPnP media player may carry the to-be-verified information in a play request message and send it to the UPnP media server, so that the UPnP media server verifies the to-be-verified information by using preset verification information, which overcomes the defect in the prior art that other control points may guess or intercept a URI on the media server and may easily steal a protected media resource on the media server, thereby ensuring media resource security.

Figure 4:
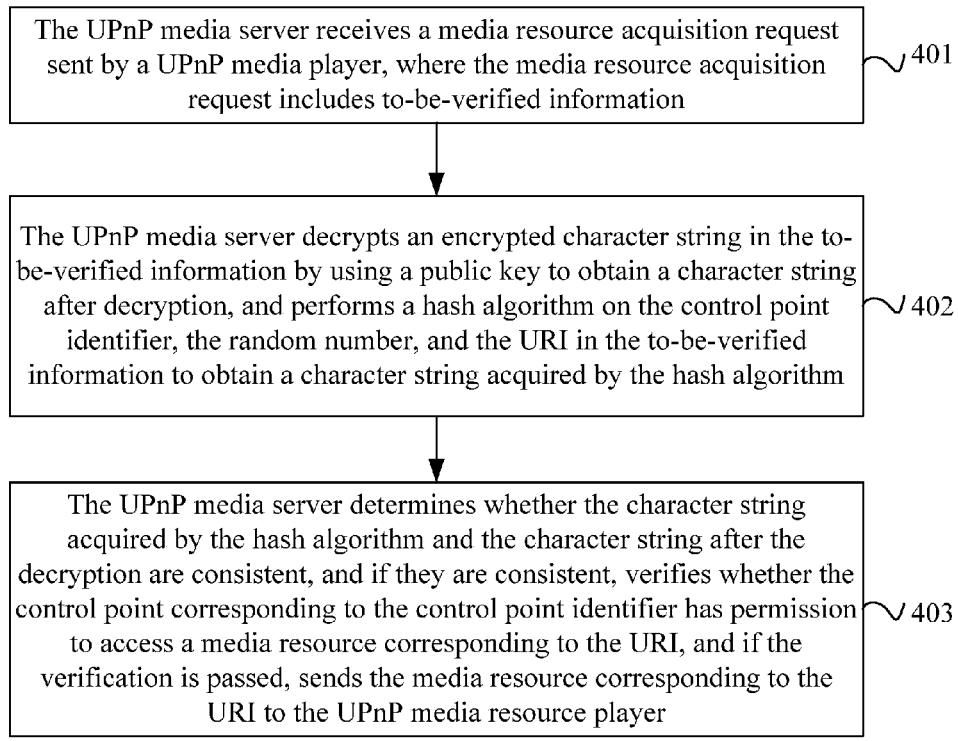
FIG. 4 is a flowchart of yet another embodiment of a media resource access control method according to the present invention.

FIG. 4 is a flowchart of yet another embodiment of a media resource access control method according to the present invention. As shown in FIG. 4, the method of this embodiment includes the following.

Step 401: The UPnP media server receives a media resource acquisition request sent by an UPnP media player, where the media resource acquisition request includes to-be-verified information.

Specifically, the UPnP media player may execute the technical solution of the method embodiment as shown in FIG. 3, an implementation principle of which is similar and is not described herein again.

Step 402: The UPnP media server decrypts an encrypted character string in the to-be-verified information by using a public key to obtain a character string after decryption, and performs a hash algorithm on the control point identifier, the random number, and the URI in the to-be-verified information to obtain a character string acquired by the hash algorithm.

Step 403: The UPnP media server determines whether the character string acquired by the hash algorithm and the character string after the decryption are consistent, and if they are consistent, verifies whether the control point corresponding to the control point identifier has permission to access a media resource corresponding to the URI, and if the verification is passed, sends the media resource corresponding to the URI to the UPnP media resource player.

In this embodiment, a UPnP media server receives a media resource acquisition request sent by a UPnP media player, where the media resource acquisition request includes to-be-verified information; decrypts an encrypted character string in the to-be-verified information by using a public key to obtain a character string after decryption and performs a hash algorithm on a control point identifier, a random number, and a URI in the to-be-verified information to obtain a character string acquired by the hash algorithm; and determines whether the character string acquired by the hash algorithm and the character string after the decryption are consistent and if they are consistent, verifies whether the control point corresponding to the control point identifier has permission to access a media resource corresponding to the URI, and if the verification is passed, sends the media resource corresponding to the URI to the UPnP media player, which overcomes the defect in the prior art that other control points may guess or intercept a URI on the media server and may easily steal a protected media resource on the media server, thereby ensuring media resource security.

Figure 5:
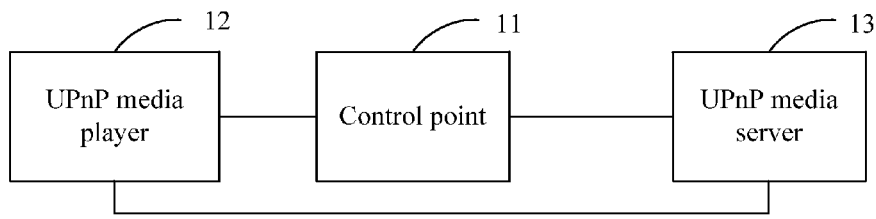
FIG. 5 is a diagram of a system architecture of an environment for implementing a media resource access control method according to the present invention.

FIG. 5 is a diagram of a system architecture of an environment for implementing a media resource access control method according to the present invention. As shown in FIG. 5, the system includes: a control point 11, a UPnP media player 12, and a UPnP media server 13, where the control point 11 includes a device such as a cell phone and a television remote control; the UPnP media player 12 includes a device such as a television (TV); and the UPnP media server 13 includes a device such as a personal computer (PC).

Figure 6:
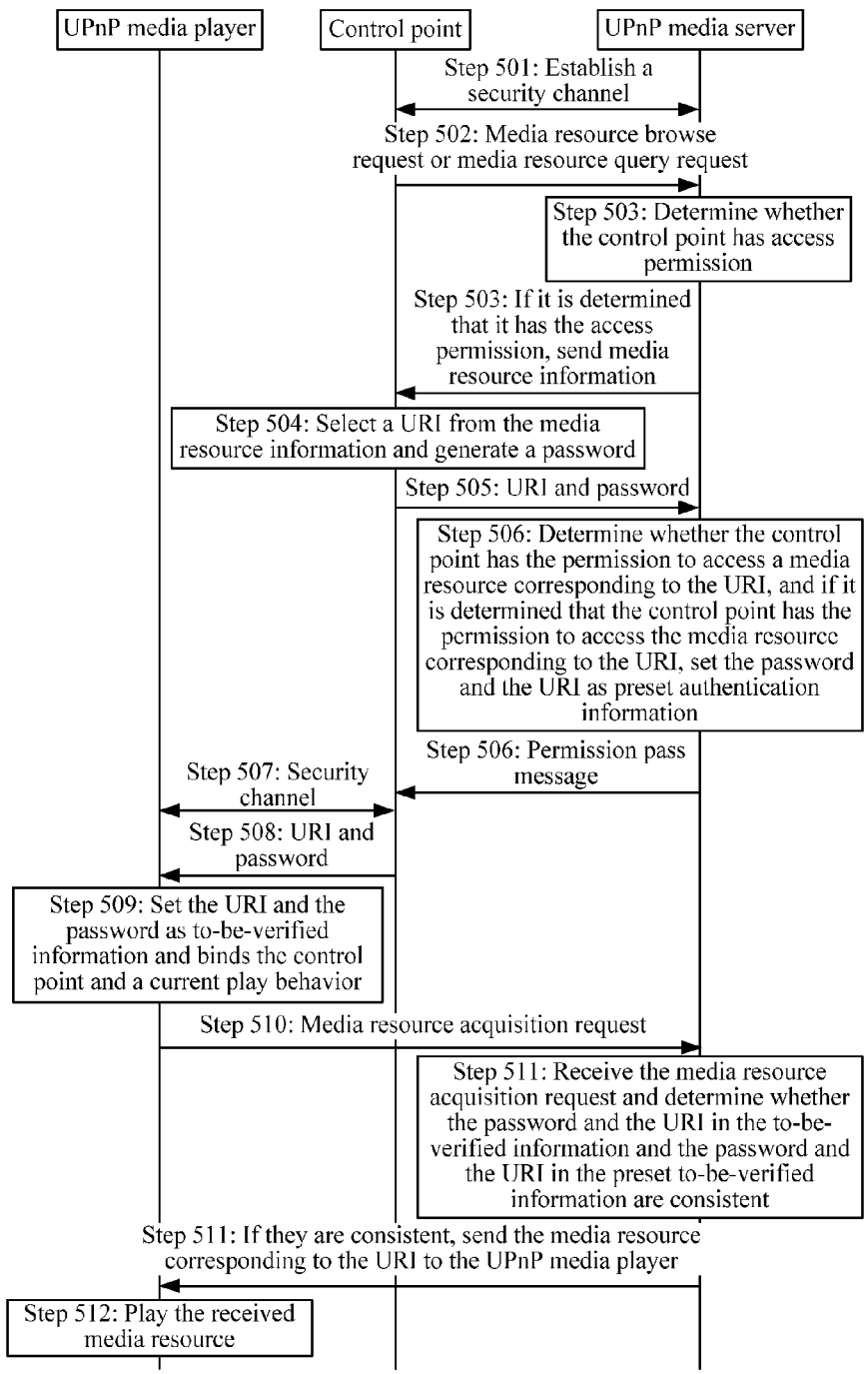
FIG. 6 is a signaling diagram of an embodiment of a media resource access control method according to the present invention.

FIG. 6 is a signaling diagram of an embodiment of a media resource access control method according to the present invention. In this embodiment, based on the embodiment as shown in FIG. 5, the method of this embodiment includes the following.

Step 501: A control point establishes a security channel with an UPnP media server.

Step 502: The control point sends a media resource browse request or a media resource query request to the UPnP media server.

Step 503: The UPnP media server determines whether the control point has access permission, and if it is determined that it has the access permission, sends media resource information to the control point.

Step 504: The control point selects a URI from the media resource information and generates a password.

Step 505: The control point sends the URI and the password to the UPnP media server.

Step 506: The UPnP media server determines whether the control point has permission to access a media resource corresponding to the URI, and if it is determined that the control point has the permission to access the media resource corresponding to the URI, sets the password and the URI as preset verification information, and sends a permission pass message to the UPnP media server.

Step 507: The control point receives the permission pass message and then establishes a security channel with the UPnP media player.

Step 508: The control point sends the URI and the password to the UPnP media player.

Step 509: The UPnP media player sets the URI and the password as to-be-verified information and binds the control point and a current play behavior.

Step 510: The UPnP media player carries the to-be-verified information in a media resource acquisition request and sends it to the UPnP media server.

Specifically, the UPnP media player carries the to-be-verified information in a media resource acquisition request in a Hypertext Transfer Protocol (HTTP) or HTTP secure (HTTPS) GET manner and sends it to the UPnP media server.

Step 511: The UPnP media server receives the media resource acquisition request and determines whether the password and the URI in the to-be-verified information and the password and the URI in the preset verification information are consistent, and if they are consistent, sends the media resource corresponding to the URI to the UPnP media player.

Step 512: The UPnP media player plays the received media resource.

It should be further noted that, the control point may further generate a policy and a user name, where the policy may be a character string in the extensible markup language (XML) format, used to stipulate a manner of using the password, for instance: the user name and the password are valid for once, or the using time of the password and the user name is restricted. In addition, a TransmitParameters( )Action may be added to the standard, as shown in Table 1, the parameters of which are: URI, UserName, Password, and Policy. Then, the control point may send the URI, the user name, the password, and the policy to the UPnP media server in a form of an Action parameter through the TransmitParameters( )Action. The TransmitParameters parameter definition may be as shown in Table 1:

TABLE 1

| Parameter | Direction | Description |
| --- | --- | --- |
| URI | Enter (IN) | URI |
| UserName | IN | User name |
| Password | IN | Password |
| Policy | IN | Policy corresponding to the user name and the password |

It should be further noted that, as shown in Table 1: URI refers to a URI selected by the control point, the parameter type of which is a character string, used to indicate a location of the media resource; UserName refers to a user name generated by the control point, the parameter type of which is a character string; Password refers to a password generated by the control point, the parameter type of which is a character string; Policy refers to a policy generated by the control point, which may be a character string in the XML format.

Figure 7:
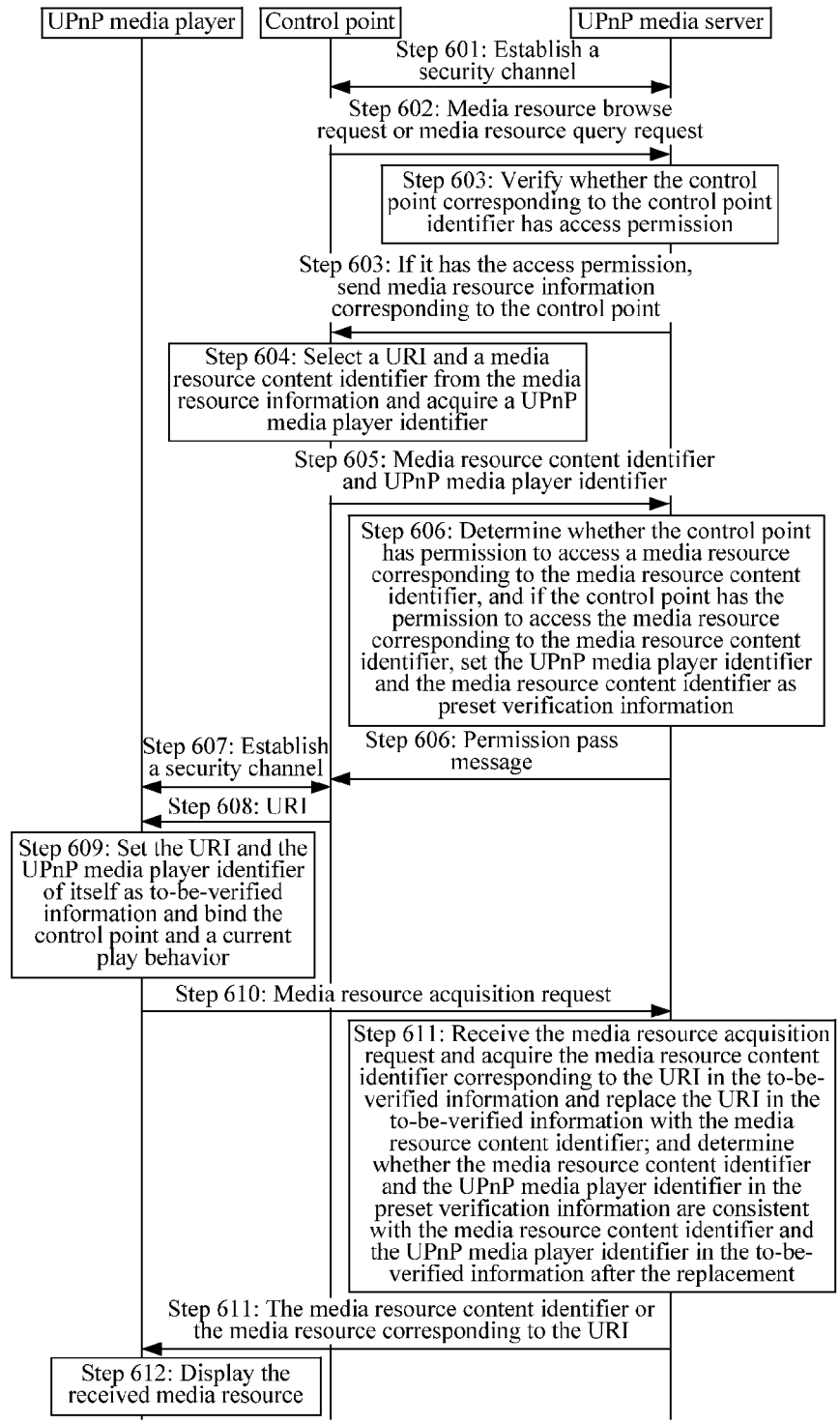
FIG. 7 is a signaling diagram of another embodiment of a media resource access control method according to the present invention.

FIG. 7 is a signaling diagram of another embodiment of a media resource access control method according to the present invention. In this embodiment, based on the embodiment as shown in FIG. 5, as shown in FIG. 7, the method of this embodiment includes the following.

Step 601: A control point establishes a security channel with an UPnP media server.

Step 602: The control point sends a media resource browse request or a media resource query request to the UPnP media server.

Step 603: The UPnP media server determines whether the control point has access permission, and if it has the access permission, sends media resource information corresponding to the control point to the control point.

Step 604: The control point selects a URI and a media resource content identifier from the media resource information and acquires an UPnP media player identifier.

Step 605: The control point sends the media resource content identifier and the UPnP media player identifier to the UPnP media server.

Step 606: The UPnP media server determines whether the control point has permission to access a media resource corresponding to the media resource content identifier, and if the control point has the permission to access the media resource corresponding to the media resource content identifier, sets the UPnP media player identifier and the media resource content identifier as preset verification information, and sends a permission pass message to the control point.

Step 607: The control point establishes a security channel with the UPnP media player according to the permission pass message.

Step 608: The control point sends the URI to the UPnP media player through the security channel.

Step 609: The UPnP media player sets the URI and the UPnP media player identifier of itself as to-be-verified information and binds the control point and a current play behavior.

Step 610: The UPnP media player carries the to-be-verified information in a media resource acquisition request and sends it to the UPnP media server.

Specifically, the UPnP media player carries the to-be-verified information in the media resource acquisition request in an HTTP or an HTTPS GET manner and sends it to the UPnP media server.

Step 611: The UPnP media server receives the media resource acquisition request and acquires the media resource content identifier corresponding to the URI in the to-be-verified information and replaces the URI in the to-be-verified information with the media resource content identifier; and determines whether the media resource content identifier and the UPnP media player identifier in the preset verification information are consistent with the media resource content identifier and the UPnP media player identifier in the to-be-verified information after the replacement, and if they are consistent, sends the media resource content identifier or the media resource corresponding to the URI to the UPnP media player.

Step 612: The UPnP media player displays the received media resource.

It should be further noted that the control point may further generate a policy and send the policy to the UPnP media server.

Specifically, the policy may be a character string in the XML format, used to stipulate a manner of using the UPnP media player identifier, for instance, the UPnP media player identifier is valid for once, or the using time of the UPnP media player identifier is restricted. In addition, a TransmitParameters( )Action may be added to the standard, as shown in Table 2, the parameters of which are: Media resource content identifier (ID), PresentationDeviceID, and Policy. Then, the control point may send the media resource content identifier, the UPnP media player identifier, and the policy to the UPnP media server in the form of an Action parameter through the TransmitParameters( )Action. The TransmitParameters parameter definition may be as shown in Table 2:

TABLE 2

| Parameter | Direction | Description |
| --- | --- | --- |
| Media resource content ID | IN | Selected media resource content identifier |
| PresentationDeviceID | IN | UPnP media player identifier |
| Policy | IN | Policy corresponding to the UPnP media player identifier |

It should be further noted that, as shown in Table 2: Media resource content ID refers to a media resource content ID selected by the control point, the parameter type of which is a character string, used to indicate a media resource; PresentationDeviceID refers to a UPnP media player identifier specified by the control point, the parameter type of which is a character string; and Policy refers to a policy generated by the control point, which may be a character string in the XML format.

Figure 8:
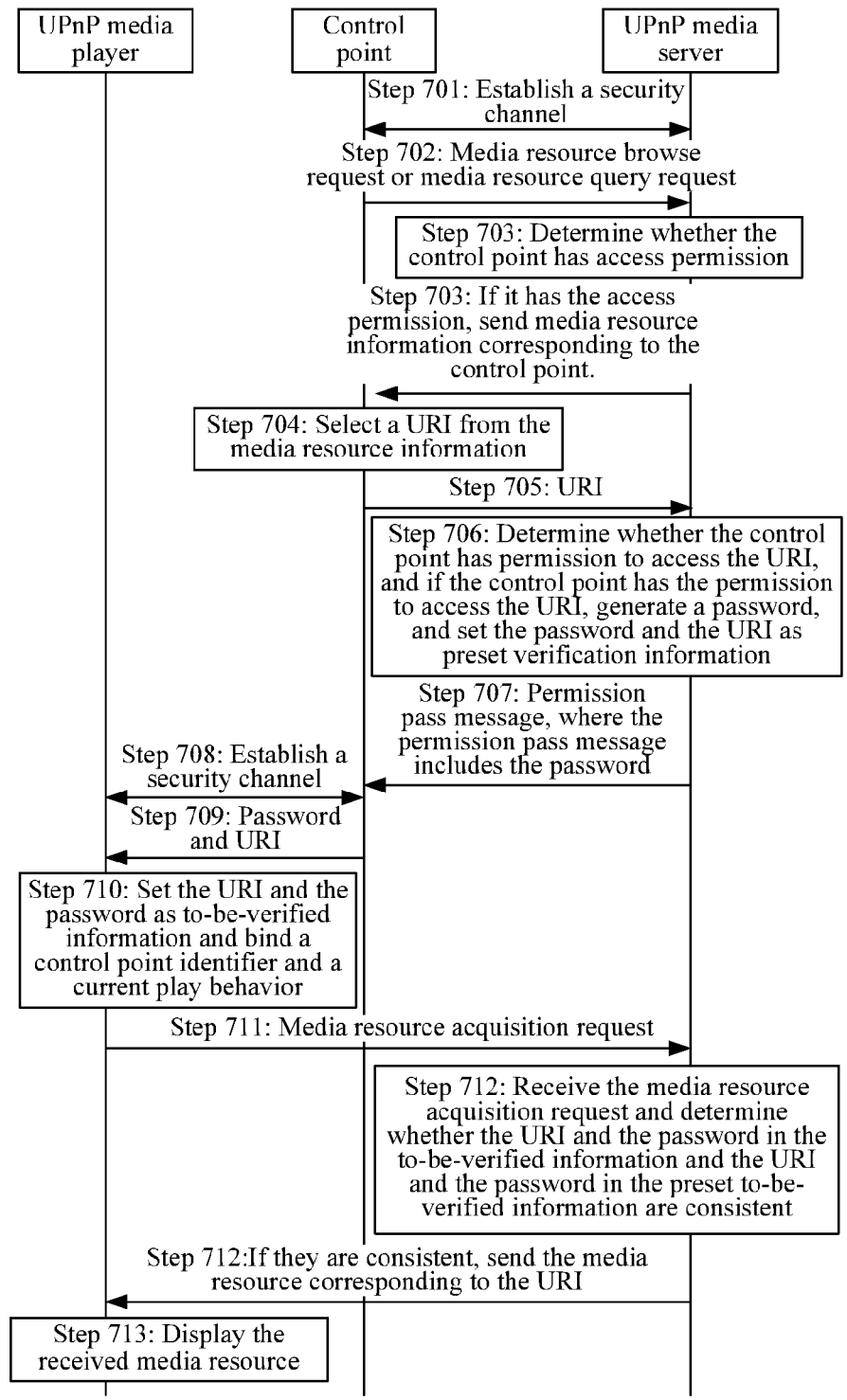
FIG. 8 is a signaling diagram of still another embodiment of a media resource access control method according to the present invention.

FIG. 8 is a signaling diagram of still another embodiment of a media resource access control method according to the present invention. In this embodiment, based on the embodiment as shown in FIG. 5, as shown in FIG. 8, the method of this embodiment includes the following.

Step 701: A control point establishes a security channel with an UPnP media server.

Step 702: The control point sends a media resource browse request or a media resource query request to the UPnP media server.

Step 703: The UPnP media server determines whether the control point has access permission, and if it has the access permission, sends media resource information corresponding to the control point to the control point.

Step 704: The control point selects a URI from the media resource information.

Step 705: The control point sends the URI to the UPnP media server.

Step 706: The UPnP media server determines whether the control point has permission to access a media resource corresponding to the URI, and if the control point has the permission to access the URI, generates a password, and sets the password and the URI as preset verification information.

Step 707: The UPnP media server returns a permission pass message to the control point, where the permission pass message includes the password.

Step 708: The control point establishes a security channel with the UPnP media player according to the permission pass message.

Step 709: The UPnP media player sends the password and the URI through the security channel to the UPnP media player.

Step 710: The UPnP media player sets the URI and the password as to-be-verified information and binds a control point identifier and a current play behavior.

Step 711: The UPnP media player carries the to-be-verified information in a media resource acquisition request and sends it to the UPnP media server.

Specifically, the UPnP media player carries the to-be-verified information in a media resource acquisition request in an HTTP or HTTPS GET manner and sends it to the UPnP media server.

Step 712: The UPnP media server receives the media resource acquisition request and determines whether the URI and the password in the to-be-verified information and the URI and the password in the preset to-be-verified information are consistent, and if they are consistent, sends the media resource corresponding to the URI to the UPnP media player.

Step 713: The UPnP media player displays the received media resource.

It should be further noted that, the UPnP media server generates a password and a user name and sends the password and the user name to the control point, the specific implementation manner of which may be that: if in a newly added TransmitParameters( )Action, the user name and the password of the UPnP media server are null, it indicates that the control point requests the user name and the password from the UPnP media server, and the UPnP media server may firstly determine whether the control point has permission to access the media resource corresponding to the URI, and if the control point has the permission to access the media resource corresponding to the URI, add a RespondTransmitParameters( )Action to a standard, as shown in Table 3, the parameters of which are UserName, Password, and Status.

Specifically, the RespondTransmitParameters parameter definition is as shown in Table 3:

TABLE 3

| Parameter | Direction | Type | Description |
| --- | --- | --- | --- |
| Status | IN | boolean | Control point's access permission towards a URI |
| UserName | IN | string | User name |
| Password | IN | string | Password |

Further, as shown in Table 3, Status is used to indicate the control point's access permission towards the media resource corresponding to the URI, the parameter type of which is boolean, and if the control point does not have the permission to access the media resource corresponding to the URI, Status=0; if the control point has the permission to access the media resource corresponding to the URI, Status=1. UserName is used to indicate the user name generated by the UPnP media server, the parameter type of which is a character string, and if the control point does not have the permission to access the URI, UserName is null (NULL); Password is used to indicate the password generated by the UPnP media server, the parameter type of which is a character string, and if the control point does not have the permission to access the media resource corresponding to the URI, the Password is NULL.

Figure 9:
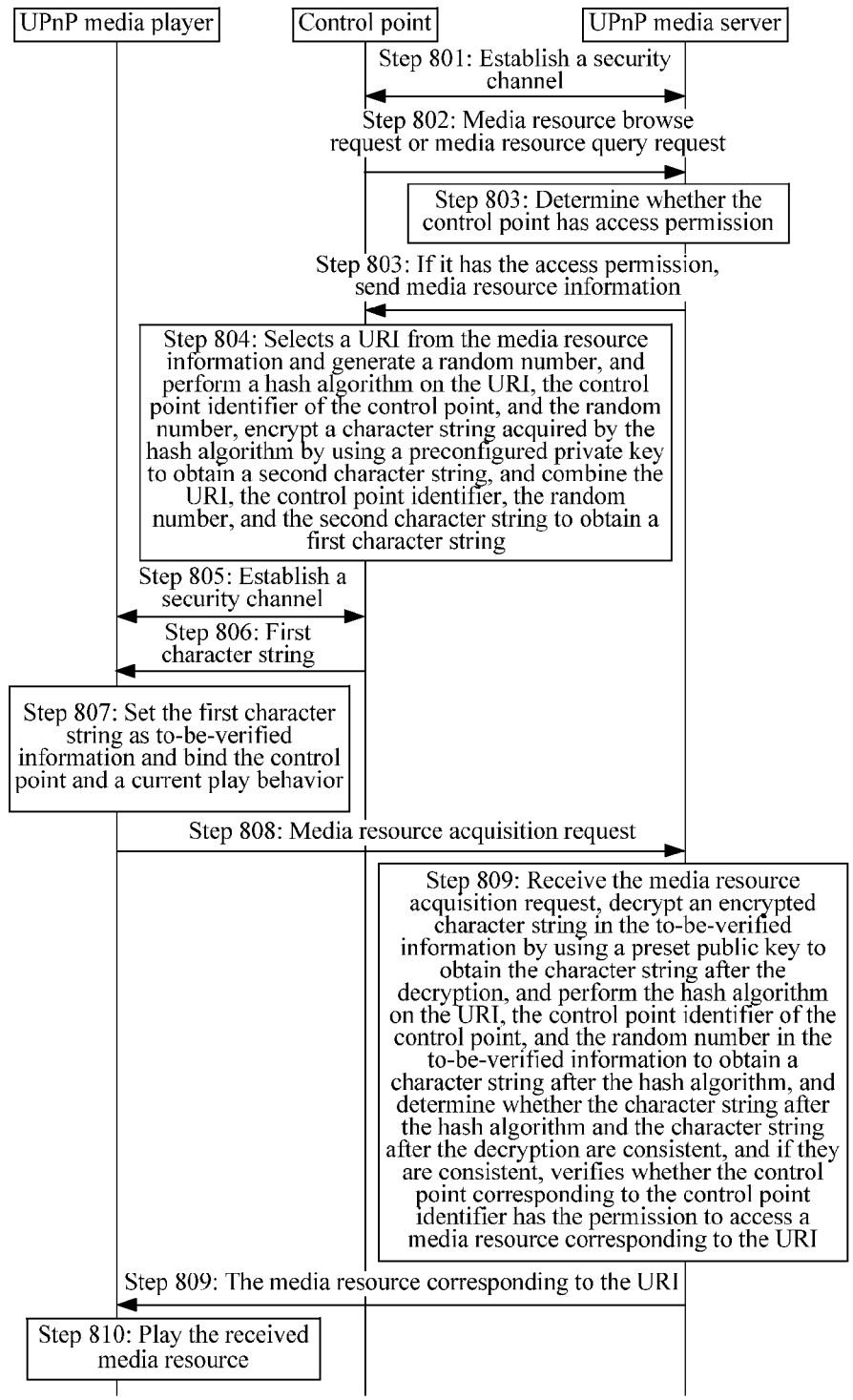
FIG. 9 is a signaling diagram of yet another embodiment of a media resource access control method according to the present invention.

FIG. 9 is a signaling diagram of yet another embodiment of a media resource access control method according to the present invention. In this embodiment, based on the embodiment as shown in FIG. 5, as shown in FIG. 9, the method of this embodiment includes the following.

Step 801: A control point establishes a security channel with an UPnP media server.

Step 802: The control point sends a media resource browse request or a media resource query request to the UPnP media server.

Step 803: The UPnP media server determines whether the control point has access permission, and if it has the access permission, sends media resource information corresponding to a control point identifier the control point.

Step 804: The control point selects a URI from the media resource information and generates a random number, and then performs a hash algorithm on the URI, the control point identifier of the control point, and the random number, encrypts a character string acquired by the hash algorithm by using a preconfigured private key to obtain a second character string, and combines the URI, the control point identifier, the random number, and the second character string to obtain a first character string.

Step 805: A control point establishes a security channel with an UPnP media player.

Step 806: The control point sends the first character string to the UPnP media player through the security channel.

Step 807: The UPnP media player sets the first character string as to-be-verified information and binds the control point and a current play behavior.

Step 808: The UPnP media player carries the to-be-verified information in a media resource acquisition request and sends it to the UPnP media server.

Specifically, the UPnP media player carries the to-be-verified information in a media resource acquisition request in an HTTP or HTTPS GET manner and sends it to the UPnP media server.

Step 809: The UPnP media server receives the media resource acquisition request, decrypts an encrypted character string in the to-be-verified information by using a preset public key to obtain the character string after the decryption, and performs the hash algorithm on the URI, the control point identifier of the control point, and the random number in the to-be-verified information to obtain a character string after the hash algorithm, and determines whether the character string after the hash algorithm and the character string after the decryption are consistent, and if they are consistent, verifies whether the control point corresponding to the control point identifier has the permission to access a media resource corresponding to the URI, and if it has the access permission, sends the media resource corresponding to the URI to the UPnP media player.

Step 810: The UPnP media player plays the received media resource.

Figure 10:
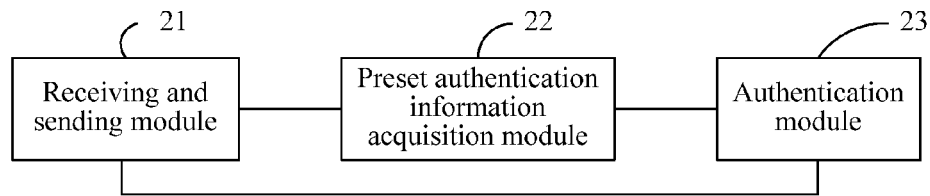
FIG. 10 is a schematic structural diagram of an embodiment of a UPnP media server according to the present invention.

FIG. 10 is a schematic structural diagram of an embodiment of an UPnP media server according to the present invention. As shown in FIG. 10, the UPnP media server of this embodiment includes: a receiving and sending module 21, a preset authentication information acquisition module 22, and an authentication module 23, where the receiving and sending module 21 is configured to receive a media resource identifier sent by a control point; the preset authentication information acquisition module 22 is configured to acquire preset authentication information corresponding to the media resource identifier; the receiving and sending module 21 is configured to receive a media resource acquisition request sent by a UPnP media player, where the media resource acquisition request contains to-be-verified information; the authentication module 23 is configured to verify the to-be-verified information by using the preset verification information; and the receiving and sending module 21 is further configured to: if the verification of the authentication module 23 is passed, send a media resource corresponding to the media resource identifier to the UPnP media player.

The UPnP media server of this embodiment may implement the technical solution of the method embodiment as shown in FIG. 1, an implementation principle of which is similar and is not described herein again.

In this embodiment, a UPnP media server receives a media resource identifier sent by a control point and acquires preset verification information corresponding to the media resource identifier; receives a media resource acquisition request sent by a UPnP media player, where the media resource acquisition request contains to-be-verified information; and verifies the to-be-verified information by using the preset verification information, and if the verification is passed, sends a media resource corresponding to the media resource identifier to the UPnP media server, which overcomes a defect that in the prior art that other control points may guess or intercept a URI on a media server and may easily steal a protected media resource on the media server, thereby ensuring media resource security.

Further, in another embodiment of the present invention, based on the embodiment as shown in FIG. 10, the preset verification information acquisition module 22 includes: a first determining unit and a first preset verification information acquisition unit, where the first determining unit is configured to determine whether the control point has permission to access the media resource corresponding to the media resource identifier; and the first preset verification information acquisition unit is configured to generate, if the first determining unit determines that the control point has the permission to access the media resource corresponding to the media resource identifier, a password, and set the password and the media resource identifier as the preset verification information; or the preset verification information acquisition module 22 includes: a second determining unit and a second preset verification information acquisition unit, where the second determining unit is configured to determine whether the control point has permission to access the media resource corresponding to the media resource identifier; and the second preset verification information acquisition unit is configured to set, if the second determining unit determines that the control point has the permission to access the media resource corresponding to the media resource identifier, the UPnP media player identifier and the media resource identifier as preset verification information; or the preset verification information acquisition module 22 includes: a third determining unit and a third preset verification information acquisition unit, where the third determining unit is configured to determine whether the control point has permission to access the media resource corresponding to the media resource identifier; and the third preset verification information acquisition unit is configured to set, if the third determining unit determines that the control point has the permission to access the media resource corresponding to the media resource identifier, a password and the media resource identifier as the preset verification information, where the password is a password generated by the control point.

It should be further noted that, the media resource identifier is a media resource content identifier and/or a URI.

Further, when the media resource identifier is a media resource content identifier, the authentication module 23 includes: a processing unit and a verification unit, where the processing unit is configured to acquire a media resource content identifier corresponding to a URI in the to-be-verified information and replace the URI in the to-be-verified information with the media resource content identifier; and the verification unit is configured to verify, by using the preset verification information, the to-be-verified information after the replacement.

Further, the receiving and sending module 21 is further configured to receive a media resource browse request or a media resource query request sent by the control point and return media resource information to the control point, so that the control point selects a media resource identifier from the media resource information.

Figure 11:
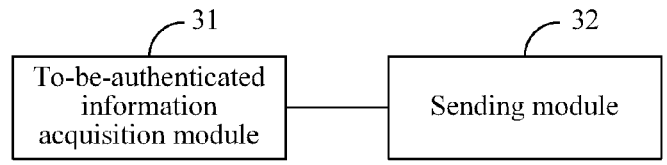
FIG. 11 is a schematic structural diagram of an embodiment of a UPnP media player according to the present invention.

FIG. 11 is a schematic structural diagram of an embodiment of an UPnP media player according to the present invention. As shown in FIG. 11, the UPnP media player of this embodiment includes: a to-be-authenticated information acquisition module 31 and a sending module 32, where the to-be-authenticated information acquisition module 31 is configured to acquire to-be-verified information; and the sending module 32 is configured to send a media play request carrying the to-be-verified information to a UPnP media server, so that the UPnP media server verifies the to-be-verified information by using preset verification information.

The UPnP media player of this embodiment may implement the technical solution of the method embodiment as shown in FIG. 2, an implementation principle of which is similar and is not described herein again.

In this embodiment, a UPnP media player acquires to-be-verified information and sends a media resource acquisition request carrying the to-be-verified information to a UPnP media server, so that the UPnP media server verifies the to-be-verified information by using preset verification information, which overcomes the defect in the prior art that other control points may guess or intercept a URI on the media server and may easily steal a protected media resource on the media server, thereby ensuring media resource security.

Further, in another embodiment of the present invention, based on the embodiment as shown in FIG. 11, the UPnP media player includes: a security channel establishing module, configured to establish a security channel with a control point.

Further, the to-be-authenticated information acquisition module 31 at least includes one of the following modules: a first to-be-verified information acquisition module, configured to receive, through the security channel, a URI and a password that are sent by the control point and set the URI and the password as the to-be-verified information; or, a second to-be-verified information acquisition module, configured to receive, through the security channel, a URI sent by the control point and set a UPnP media player identifier corresponding to the UPnP media player and the URI as the to-be-verified information; or, a third to-be-verified information acquisition module, configured to receive, through the security channel, a first character string sent by the control point, where the first character string includes a URI selected by the control point from media resource information acquired from the UPnP media server, a random number generated by the control point, a control point identifier of the control point, and a second character string, where the second character string is a character string acquired by performing a hash algorithm on the URI, the random number, and the control point identifier and encrypting a character string acquired by the hash algorithm by using a private key, where the URI is a URI selected by the control point from the media resource information acquired from the UPnP media server.

Figure 12:
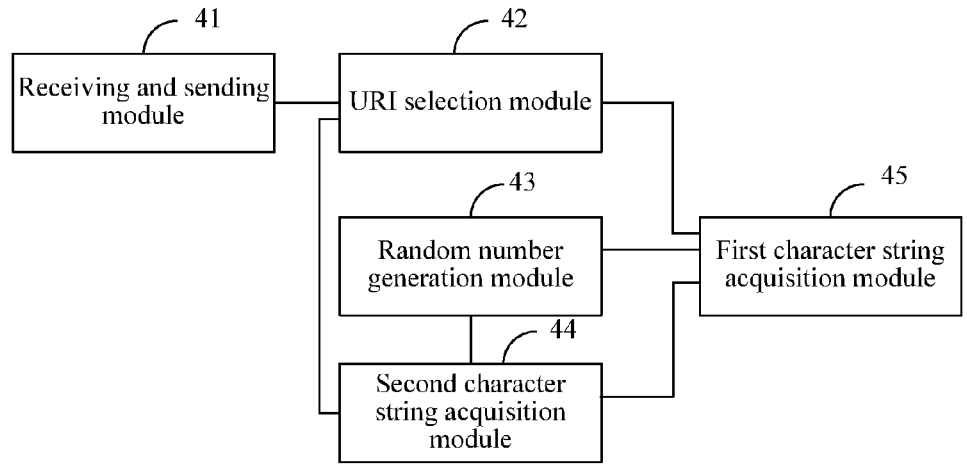
FIG. 12 is a schematic structural diagram of an embodiment of a control point according to the present invention.

FIG. 12 is a schematic structural diagram of an embodiment of a control point according to the present invention. As shown in FIG. 12, the control point of this embodiment includes: a receiving and sending module 41, a URI selection module 42, a random number generation module 43, a second character string acquisition module 44, and a first character string acquisition module 45, where the receiving and sending module 41 is configured to send a media resource browse request or a media resource query request and receive media resource information returned by a UPnP media server; the URI selection module 42 is configured to select a URI from the media resource information; the random number generation module 43 is configured to generate a random number; the second character string acquisition module 44 is configured to perform a hash algorithm on the URI, the random number, and a control point identifier of the control point and encrypt a character string acquired by the hash algorithm by using a private key to obtain a second character string; the first character string acquisition module 45 is configured to combine the URI, the random number, the control point identifier, and the second character string to obtain a first character string; and the receiving and sending module 41 is further configured to send the first character string to a UPnP media player so that the UPnP media player uses the first character string as to-be-verified information.

The control point of this embodiment may implement the technical solution of the method embodiment as shown in FIG. 3, an implementation principle of which is similar and is not described herein again.

In this embodiment, a control point sends a media resource browse request or a media resource query request to a UPnP media server and receives media resource information returned by the UPnP media server; selects a URI from the media resource information and generates a random number; performs a hash algorithm on the URI, the random number, and the control point identifier and encrypts a character string acquired by the hash algorithm by using a private key to obtain a second character string; and combines the URI, the random number, the control point identifier, and the second character string to obtain a first character string and sends the first character string to the UPnP media player, so that the media player uses the first character string as to-be-verified information; the UPnP media player may carry the to-be-verified information in a play request message and send it to the UPnP media server, so that the UPnP media server verifies the to-be-verified information by using preset verification information, which overcomes the defect in the prior art that other control points may guess or intercept a URI on the media server and may easily steal a protected media resource on the media server, thereby ensuring media resource security.

Figure 13:
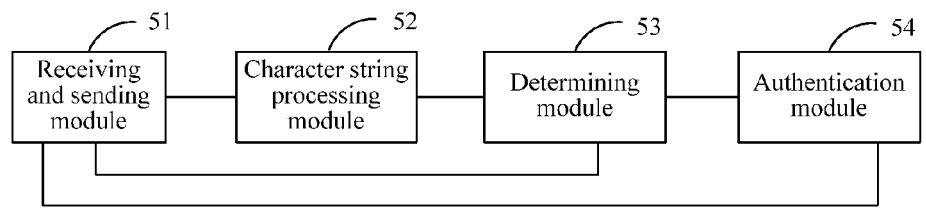
FIG. 13 is a schematic structural diagram of an embodiment of an UPnP media server according to the present invention.

FIG. 13 is a schematic structural diagram of an embodiment of an UPnP media server according to the present invention. As shown in FIG. 13, the UPnP media server of this embodiment includes: a receiving and sending module 51, a character string processing module 52, a determining module 53, and an authentication module 54, where the receiving and sending module 51 is configured to receive a media resource acquisition request sent by a UPnP media player, where the media resource acquisition request includes to-be-verified information; the character string processing module 52 is configured to decrypt an encrypted character string in the to-be-verified information by using a public key to obtain a character string after the decryption, and perform a hash algorithm on a control point identifier, a random number, and a URI in the to-be-verified information to obtain a character string acquired by the hash algorithm; the determining module 53 is configured to determine whether the character string acquired by the hash algorithm and the character string after the decryption are consistent; the verification module 54 is configured to: if the determining module 53 determines that they are consistent, verify whether a control point corresponding to the control point identifier has permission to access a media resource corresponding to the URI; and the receiving and sending module 51 is further configured to: if the verification of the authentication module 54 is passed, send the media resource corresponding to the URI to the UPnP media player.

The UPnP media server of this embodiment may implement the technical solution of the method embodiment as shown in FIG. 4, an implementation principle of which is similar and is not described herein again.

In this embodiment, a UPnP media server receives a media resource acquisition request sent by a UPnP media player, where the media resource acquisition request includes to-be-verified information; decrypts an encrypted character string in the to-be-verified information by using a public key to obtain a character string after decryption and performs a hash algorithm on a control point identifier, a random number, and a URI in the to-be-verified information to obtain a character string acquired by the hash algorithm; and determines whether the character string acquired by the hash algorithm and the character string after the decryption are consistent, and if they are consistent, verifies whether the control point corresponding to the control point identifier has permission to access a media resource corresponding to the URI, and if the verification is passed, sends the media resource corresponding to the URI to the UPnP media player, which overcomes the defect in the prior art that other control points may guess or intercept a URI on the media server and may easily steal a protected media resource on the media server, thereby ensuring media resource security.

The present invention provides a media resource access control system, including: a control point, a UPnP media server, and a UPnP media player, where the UPnP media server may be the UPnP media server as shown in the embodiment of FIG. 10, and the UPnP media player may be the UPnP media player as shown in the embodiment of FIG. 11.

The present invention further provides a media resource access control system, including: a control point, a UPnP media server, and a UPnP media player, where the control point may be the control point as shown in the embodiment of FIG. 12, the UPnP media server may be the UPnP media server as shown in FIG. 13, and the UPnP media player may be the UPnP media player as shown in FIG. 11.

Persons of ordinary skill in the art may understand that, all or a part of the steps of the methods in the embodiments may be implemented by a program instructing relevant hardware. The foregoing program may be stored in a computer readable storage medium. When the program runs, the preceding steps included in the method embodiments are performed; the foregoing storage medium may be any medium capable of storing program codes, such as a read-only memory (ROM), a random access memory (RAM), a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof, as long as such modifications or replacements do not cause the essence of the technical solutions to depart from the and scope of the technical solutions of the embodiments of the present invention.

What is claimed is:

1. A media resource access control method, comprising:
receiving, by a universal plug and play (UPnP) media server and from a control point, a media resource identifier comprising a media resource content identifier;
acquiring, by the UPnP media server, a preset verification information corresponding to the media resource identifier;
receiving, by the UPnP media server, a media resource acquisition request sent by an UPnP media player, wherein the media resource acquisition request contains a to-be-verified information;
verifying, by the UPnP media server, the to-be-verified information using the preset verification information by:
acquiring, by the UPnP media server, the media resource content identifier corresponding to a uniform resource identifier (URI) in the to-be-verified information;
replacing the URI in the to-be-verified information with the media resource content identifier; and
verifying, by the UPnP media server using the preset verification information, the to-be-verified information after the replacement; and
sending a media resource corresponding to the media resource identifier to the UPnP media player when the to-be-verified information is verified.

2. The media resource access control method according to claim 1, wherein receiving, by the UPnP media server, the media resource identifier sent by the control point, and acquiring preset verification information corresponding to the media resource identifier comprises:
receiving, by the UPnP media server, the media resource identifier sent by the control point;
determining whether the control point has permission to access the media resource corresponding to the media resource identifier; and
generating, by the UPnP media server, a password when the control point has the permission to access the media resource corresponding to the media resource identifier and setting the password and the media resource identifier as the preset verification information.

3. The media resource access control method according to claim 1, further comprising:
receiving, by the UPnP media server, either a media resource browse request or a media resource query request sent by the control point; and
returning media resource information to the control point, wherein the control point selects a media resource identifier from the media resource information.

4. The media resource access control method according to claim 1, wherein receiving, by the UPnP media server, the media resource identifier sent by the control point, and acquiring preset verification information corresponding to the media resource identifier comprises:
receiving, by the UPnP media server, the media resource identifier and a UPnP media player identifier that are sent by the control point;
determining whether the control point has permission to access the media resource corresponding to the media resource identifier; and
setting, by the UPnP media server, the UPnP media player identifier and the media resource identifier as the preset verification information when the control point has the permission to access the media resource corresponding to the media resource identifier.

5. The media resource access control method according to claim 1, wherein receiving, by the UPnP media server, the media resource identifier sent by the control point, and acquiring preset verification information corresponding to the media resource identifier comprises:
receiving, by the UPnP media server, the media resource identifier and a password that are sent by the control point;
determining whether the control point has permission to access the media resource corresponding to the media resource identifier, wherein the password is a password generated by the control point; and
setting, by the UPnP media server, the password and the media resource identifier as the preset verification information when the control point has the permission to access the media resource that corresponds to the media resource identifier.

6. A media resource access control method, comprising:
establishing, by a universal plug and play (UPnP) media player, a security channel with a control point;
acquiring, by the UPnP media player, a to-be-verified information comprising:
receiving, by the UPnP media player and through the security channel, a first character string sent by the control point, wherein the first character string comprises a uniform resource identifier (URI) acquired by the control point from the UPnP media server, a random number generated by the control point, a control point identifier of the control point, and a second character string, wherein the second character string is acquired by performing a hash algorithm on the URI, the random number, and the control point identifier; and
encrypting a character string acquired by the hash algorithm using a private key; and
sending, by the UPnP media player, a media resource acquisition request carrying the to-be-verified information to a UPnP media server, wherein the UPnP media server verifies the to-be-verified information using a preset verification information.

7. A media resource access control method, comprising:
sending, by a control point, either a media resource browse request or a media resource query request to a universal plug and play (UPnP) media server;
receiving, by the control point, a media resource information returned by the UPnP media server;
selecting, by the control point, a uniform resource identifier (URI) from the media resource information;
generating, by the control point, a random number;
performing, by the control point, a hash algorithm on the URI, the random number, and a control point identifier of the control point;
encrypting, by the control point, a character string acquired by the hash algorithm by using a private key to obtain a second character string;
combining, by the control point, the URI, the random number, the control point identifier, and the second character string to obtain a first character string; and
sending, by the control point, the first character string to an UPnP media player, wherein the UPnP media player uses the first character string as to-be-verified information.

8. A media resource access control method, comprising:
receiving, by a universal plug and play (UPnP) media server, a media resource acquisition request sent by a UPnP media player, wherein the media resource acquisition request contains a to-be-verified information;
decrypting, by the UPnP media server, an encrypted character string in the to-be-verified information using a public key to obtain a character string after the decryption;
performing, by the UPnP media server, a hash algorithm on a control point identifier, a random number, and a uniform resource identifier (URI) in the to-be-verified information to obtain a character string acquired by the hash algorithm;
determining, by the UPnP media server, whether the character string acquired by the hash algorithm and the character string after the decryption are consistent;
verifying whether a control point corresponding to the control point identifier has permission to access a media resource corresponding to the URI when the character string acquired by the hash algorithm and the character string after the decryption are consistent; and
sending the media resource corresponding to the URI to the UPnP media player when the control point corresponding to the control point identifier passes verification.

9. A universal plug and play (UPnP) media server, comprising:
a memory for storing computer executable instructions; and
a processor configured to execute the computer executable instructions that cause the UPnP media server to perform the following:
receive, from a control point, a media resource identifier comprising a media resource content identifier;
acquire a preset verification information corresponding to the media resource identifier;
receive a media resource acquisition request sent by an UPnP media player, wherein the media resource acquisition request contains a to-be-verified information;
verify the to-be-verified information using the preset verification information by:
acquiring the media resource content identifier corresponding to a uniform resource identifier (URI) in the to-be-verified information;
replacing the URI in the to-be-verified information with the media resource content identifier; and
verifying using the preset verification information, the to-be-verified information after the replacement; and
send a media resource corresponding to the media resource identifier to the UPnP media player when the to-be-verified information passes verification.

10. The UPnP media server according to claim 9, wherein the computer executable instructions executed by the processor cause the UPnP media server to acquire the preset verification information corresponding to the media resource identifier by:
determining whether the control point has permission to access the media resource corresponding to the media resource identifier; and
generating, a password when the control point has the permission to access the media resource corresponding to the media resource identifier and set the password and the media resource identifier as the preset verification information.

11. The UPnP media server according to claim 9, wherein the computer executable instructions executed by the processor further cause the UPnP media server to receive a media resource browse request or a media resource query request sent by the control point and return media resource information to the control point, and wherein the control point selects the media resource identifier from the media resource information.

12. The UPnP media server according to claim 9, wherein the computer executable instructions executed by the processor cause the UPnP media server to acquire the preset verification information corresponding to the media resource identifier by:
determining whether the control point has permission to access the media resource corresponding to the media resource identifier; and
setting an UPnP media player identifier and the media resource identifier as the preset verification information when the control point has the permission to access the media resource corresponding to the media resource identifier.

13. The UPnP media server according to claim 9, wherein the computer executable instructions executed by the processor cause the UPnP media server to acquire the preset verification information corresponding to the media resource identifier by:
determining whether the control point has permission to access the media resource corresponding to the media resource identifier; and
setting, a password and the media resource identifier as the preset verification information when the control point has the permission to access the media resource corresponding to the media resource identifier, wherein the password is a password generated by the control point.

14. A universal plug and play (UPnP) media player, comprising:
a memory for storing computer executable instructions; and
a processor configured to execute the computer executable instructions that cause the UPnP media player to perform the following:

establish a security channel with a control point;
acquire a to-be-verified information by: receiving, through the security channel, a first character string sent by the control point, wherein the first character string comprises a uniform resource identifier (URI) selected by the control point from media resource information acquired from the UPnP media server, a random number generated by the control point, a control point identifier of the control point, and a second character string, wherein the second character string is a character string acquired by performing a hash algorithm on the URI, the random number, and the control point identifier and encrypting a character string acquired by the hash algorithm using a private key, and wherein the URI is selected by the control point from the media resource information acquired from the UPnP media server; and
send a media play request carrying the to-be-verified information to an UPnP media server,
wherein the UPnP media server verifies the to-be-verified information using preset verification information.

15. A control point, comprising:
a memory for storing computer executable instructions; and
a processor configured to execute the computer executable instructions that cause the control point to perform the following:
send either a media resource browse request or a media resource query request to a universal plug and play (UPnP) media server;
receive a media resource information returned by the UPnP media server;
select a uniform resource identifier (URI) from the media resource information;
generate a random number;
perform a hash algorithm on the URI, the random number, and a control point identifier of the control point and encrypt a character string acquired by the hash algorithm using a private key to obtain a second character string;
combine the URI, the random number, the control point identifier, and the second character string to obtain a first character string; and
send the first character string to an UPnP media player, wherein the UPnP media player uses the first character string as to-be-verified information.

16. A universal plug and play (UPnP) media server, comprising:
a memory for storing computer executable instructions; and
a processor configured to execute the computer executable instructions that cause a control point to perform the following:
receive a media resource acquisition request sent by an UPnP media player, wherein the media resource acquisition request contains a to-be-verified information;
decrypt an encrypted character string in the to-be-verified information using a public key to obtain a character string after the decryption;
perform a hash algorithm on a control point identifier, a random number, and a uniform resource identifier (URI) in the to-be-verified information to obtain a character string acquired by the hash algorithm;
determine whether the character string acquired by the hash algorithm and the character string after the decryption are consistent;
verify whether a control point corresponding to the control point identifier has permission to access a media resource corresponding to the URI when the character string acquired by the hash algorithm and the character string after the decryption are consistent; and
send the media resource corresponding to the URI to the UPnP media player when the control point corresponding to the control point identifier passes verification.

* * * * *

UNITED STATES PATENT AND TRADEMARK OFFICE
CERTIFICATE OF CORRECTION

PATENT NO. : 9,152,804 B2  Page 1 of 1
APPLICATION NO. : 14/145239
DATED : October 6, 2015
INVENTOR(S) : Shan et al.

It is certified that error appears in the above-identified patent and that said Letters Patent is hereby corrected as shown below:

Title page item (30), Foreign Application Priority Data should read:

Jul. 11, 2011   (CN) ................................ 201110193031.X

Signed and Sealed this
Third Day of May, 2016

Michelle K. Lee
*Director of the United States Patent and Trademark Office*